Oct. 8, 1929.                J. ZATTI                    1,731,087
                        METAL BENDING DEVICE
                     Filed June 20, 1927      2 Sheets-Sheet 1

Joseph Zatti
INVENTOR

BY *Victor J. Evans*
ATTORNEY

WITNESS:

Oct. 8, 1929. J. ZATTI 1,731,087
METAL BENDING DEVICE
Filed June 20, 1927   2 Sheets-Sheet 2
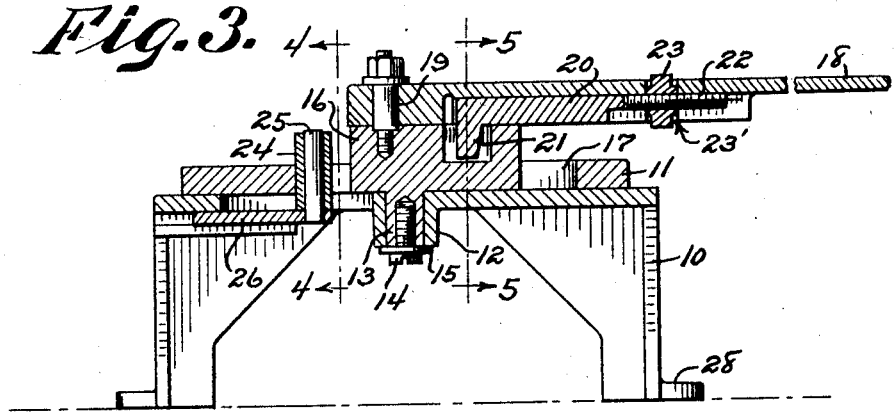
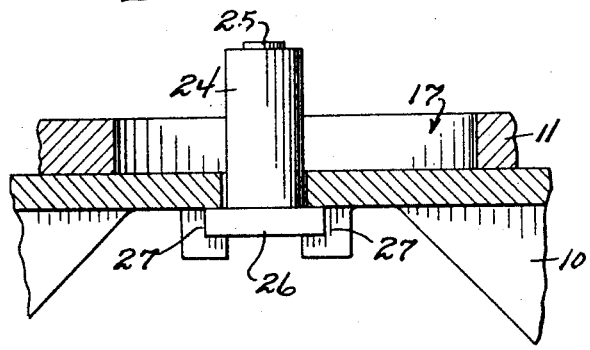
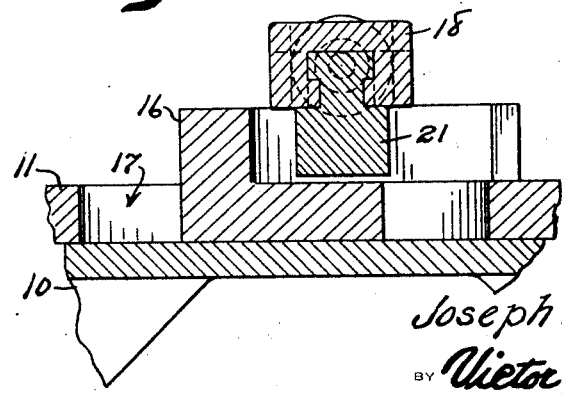
Joseph Zatti INVENTOR
BY Victor J. Evans ATTORNEY
WITNESS:

Patented Oct. 8, 1929

1,731,087

UNITED STATES PATENT OFFICE

JOSEPH ZATTI, OF HARTFORD, CONNECTICUT

METAL-BENDING DEVICE

Application filed June 20, 1927. Serial No. 200,112.

This invention relates to improvements in metal bending machines and has for an object the provision of a machine by means of which metal bars, rods, and the like may be bent into various shapes and designs.

Another object of the invention is the provision of a machine of the above character which is simple in construction, efficient in use and may be operated with a minimum amount of power.

Another object of the invention is the provision of a machine which in addition to bending metal, will hold the metal in place for welding operation when desired.

With the above and other objects in view, the invention further includes the following novel features and details of construction, to be hereinafter more fully described, illustrated in the accompanying drawings and pointed out in the appended claims.

In the drawings:—

Figure 3 is a section on the line 3—3 of Figure 1.

Figure 1:
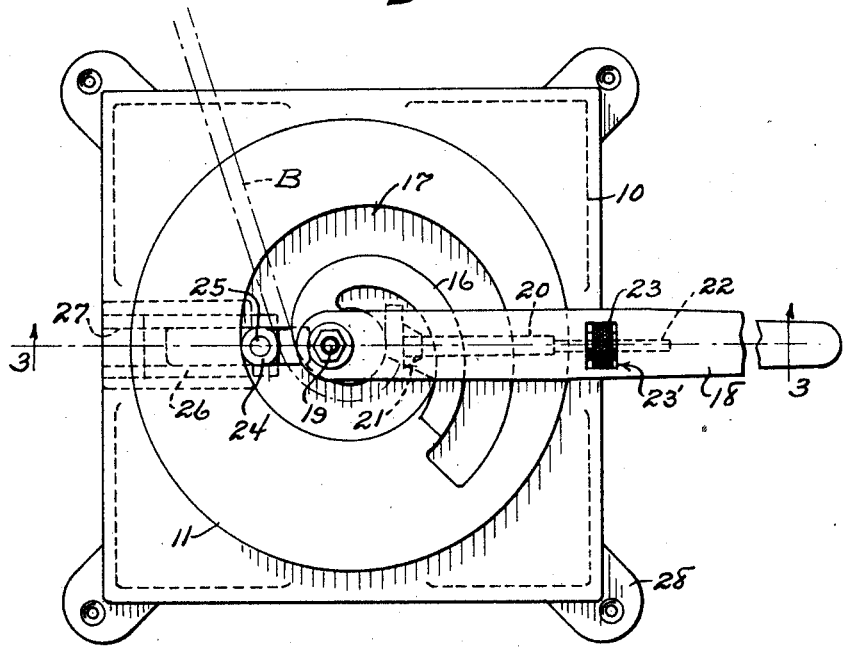
Figure 1 is a plan view of the machine.
Figure 2:
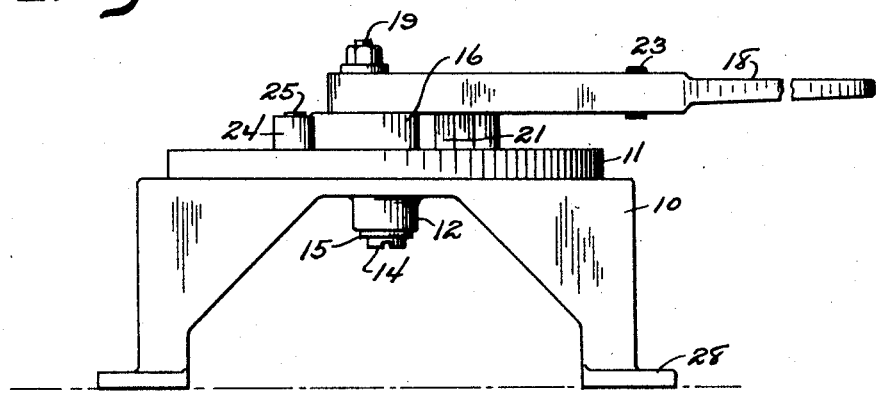
Figure 2 is a side view.

Figures 4 and 5 are enlarged fragmentary sections taken respectively on the lines 4—4 and 5—5 of Figure 3.

Referring to the drawings in detail wherein like characters of reference denote corresponding parts, the reference character 10 indicates a table or stand upon which there is rotatably mounted a disk 11. For this purpose, the table has extending downwardly therefrom a sleeve 12 which receives a downwardly extending pivot 13 located concentrically upon the under face of the disk 11. Suitable means are provided for holding the pivot within the sleeve 12, the means shown consisting of a bolt or stud 14 which carries a retaining collar 15.

Located upon and movable with the disk 11 is a former 16. This former may be an integral part of the disk 11, or it may be removably secured thereto so as to rotate with the disk. This former may be of any shape, its shape being regulated in accordance with the character of the bend of the metal. For example, the former may consist of a circular disk for use in bending metal bars or strips into circular form, or it may be oval or egg shaped, or any other desired shape. The former shown is substantially spiral and the disk 11 is provided with a spiral slot 17, the slot in the disk of course conforming to the shape of the former.

In order to rotate the disk and former there is provided an operating lever 18 which is removably secured on the former by means of a pivot 19. The lever 18 has slidingly mounted in its under face the shank 20 of a clamping jaw 21 and this shank is provided with a threaded extension 22. An operating nut 23 is mounted upon the threaded extension 22 and extends through an opening 23' provided in the lever 18. By rotating the nut 23, the clamping jaw may be adjusted longitudinally of the lever and may engage with the end of a bar B as shown by the dotted lines in Figure 1.

In order to keep the bar or work against the edge of the frame 16 there is provided a follower. This follower is formed of a sleeve 24 which is mounted upon a spindle or stud 25, the latter being carried by a slide 26 which is movable in guideways 27 located beneath the table 10. The sleeve 24 in addition to engaging the work as shown in Figure 1 of the drawings, is engaged by the outer wall of the slot 17, so that when the former 16 and disk 11 are rotated, the follower is moved accordingly. As the sleeve 24 is rotatable upon the spindle or stud 25, friction between the parts will be materially reduced. The clamping jaw 21 in addition to clamping the work to the former, also serves as a means for providing a rigid connection between the former and the opreating handle 18. By reference to Figure 1 of the drawings, it will be seen that the handle 18 is operated in an anti-clockwise direction and as the jaw 21 is clamped against the end of the work indicated at B, movement of the jaw will rotate the former. The operating handle however may be detached from the pivot 19 for the substitution of formers of different types while the handle 18 may be moved pivotally prior to adjustment of the clamp 21 so as to engage the end of the work at the point desired.

In addition to its use for bending metal, the machine will hold the metal in place for convenience in welding.

The table 10 may be of any suitable shape and is preferably provided with feet 28 so that it may be firmly held in place.

The invention is susceptible of various changes in its form, proportions and minor details of construction and the right is herein reserved to make such changes as properly fall within the scope of the appended claims.

Having described the invention what is claimed is:—

1. A metal bending machine comprising a rotatably mounted disk having a slot therein, a former mounted upon and movable with the disk, means to clamp the work to the former, and a follower extending through and engageable by one wall of the slot in the disk to hold said follower to the work.

2. A metal bending machine comprising a rotatably mounted disk having an eccentric slot therein, a former mounted upon and movable with the disk, means to clamp the work to the former and a follower extending through and engageable by one wall of the slot in the disk to hold said follower to the work.

In testimony whereof I affix my signature.

JOSEPH ZATTI.